United States Patent [19]
Kelly

[11] 4,433,713
[45] Feb. 28, 1984

[54] BLIND

[76] Inventor: Larry L. Kelly, 3295 Bridle Dr., Hayward, Calif. 94541

[21] Appl. No.: 399,634

[22] Filed: Jul. 19, 1982

[51] Int. Cl.³ .......................... E06B 9/26; E06B 9/38; F16D 63/00

[52] U.S. Cl. .......................... 160/166 R; 160/178 R; 188/82.1

[58] Field of Search .................... 160/368 G, 174, 175, 160/176, 166–168, 166 A, 166 R, 107; 242/147 R, 156.1, 156; 182/208, 231, 232, 235; 188/82.1, 82.3, 82.34

[56] References Cited

U.S. PATENT DOCUMENTS

| | | | |
|---|---|---|---|
| 3,721,285 | 3/1973 | Debs | 160/166 R |
| 3,828,838 | 8/1974 | Anderle et al. | 160/176 |
| 4,057,220 | 11/1977 | Kudlacek | 188/82.1 |
| 4,141,402 | 2/1979 | Marotto | 160/176 R |

FOREIGN PATENT DOCUMENTS

| | | | |
|---|---|---|---|
| 402647 | 5/1966 | Switzerland | 160/176 |

*Primary Examiner*—Peter M. Caun
*Assistant Examiner*—Cherney S. Lieberman
*Attorney, Agent, or Firm*—Townsend and Townsend

[57] ABSTRACT

In a blind of the type having a plurality of parallel slats, said slats being simultaneously tiltable to any desired angle to adjust the amount of light admitted through said blinds, an improvement including a flexible tension means, such as a guy wire, along the length of the blind, perpendicular to the slats, and between a headrail and a basebar. The guy wire is tensioned such that the slats are supported and such that their edges are coplanar with each other. Means in the form of a ratchet are provided for maintaining proper guy wire tautness. The blind may be positioned in any orientation and yet continue to function as intended without sagging or drooping. A universal means is provided for adjusting the angle to which the slats are tilted. In this way, a blind positioned at an angle, such as on a ceiling, is as readily adjustable as a blind positioned on a vertical wall.

5 Claims, 9 Drawing Figures

BLIND

BACKGROUND OF THE INVENTION

1. Field of the Invention

The present invention relates to window blinds. More particularly, the present invention relates to the mounting of such blinds in other than a vertical orientation.

2. Description of the Prior Art

Wherever there are windows, there is a need for privacy, shade, and accenting decoration. Blinds provide an excellent method for controlling privacy and for controlling the amount of light entering through windows while adding a decorative accent to the window.

Window blinds, such as Venetian blinds, are known. Such blinds comprise several parallel slats arranged one over the other. The blinds include a headrail from which the slats are suspended and a basebar or baserail that maintains a gravity (downward) bias on the slats to hold them in a generally coplanar alignment.

Such blinds also include a tilt device wherein the slats may be simultaneously selectively positioned at various angles to adjust the amount of light admitted by the blind. The tilt device usually includes an elongated shaft projecting from a tilt adjust mechanism. Twisting the shaft adjusts slat tilt.

Additionally, blinds of this type have a draw device that allows the slats to be either selectively drawn together such that the blind is raised, or separated such that the blind is lowered. Raising or lowering of the blind is accomplished with a drawstring that extends from the headrail through each slat and to the baserail. To raise or lower the blind, the drawstring is pulled or released. A catch grabs the drawstring and the blind is maintained in the raised position. To reposition the blind, the catch is released.

The blind slats are joined to each other by a string, a series of strings, a cloth tape, or the like that either runs along the edges of the slats, perpendicular to the slats, or that runs through coaxial apertures through each of the slats.

Such blinds work very well when suspended in a vertical orientation. However, windows are often placed in other than vertical walls. They are often placed in ceilings, they are placed at angles, they are placed in any way possible to create a light, open, and airy feeling.

Prior art blinds only operate in a vertical orientation. Hanging a typical blind from a ceiling, for example, would require attaching both the headrail and the baserail to the window frame such that the blind would be stretched across the window. A problem with this simple solution to the problem of hanging blinds in an other than vertical orientation resides in the nature of the blind itself. The slats are strung together in such a manner that when the blind is placed in an other than vertical orientation, the slats sag or pull downwardly according to their center of gravity. In the example of hanging a blind from a ceiling, the blind would assume a bow shape with the slats at the center of the blind dipping significantly out of the plane of the headrail and baserail. With this arrangement it would be difficult to adjust the blinds as desired. Furthermore, the sagging, drooping blinds would be unsightly.

SUMMARY OF THE INVENTION

The present invention discloses an improved blind of the type having a plurality of parallel slats, said slats being simultaneously tiltable to any desired angle to thereby adjust the amount of light admitted through said blinds. The improvement relates to a flexible tension means, such as a guy wire, that is run along the length of the blind, perpendicular to the slats, and between a blind headrail and a blind baserail. The guy wire is such that the slats are supported and such that their edges are coplanar with each other. Means in the form of a ratchet are provided for maintaining proper guy wire tautness. The blind may be positioned in any orientation and yet continue to function as intended without sagging or drooping. A universal means is provided for adjusting the angle to which the slats are tilted. In this way, a blind positioned on a ceiling is as readily adjustable as a blind positioned on a vertical wall.

BRIEF DESCRIPTION OF THE DRAWINGS

The present invention is best understood by referring to the specification and the following drawings, in which.

DETAILED DESCRIPTION OF A PREFERRED EMBODIMENT

Figure 1:
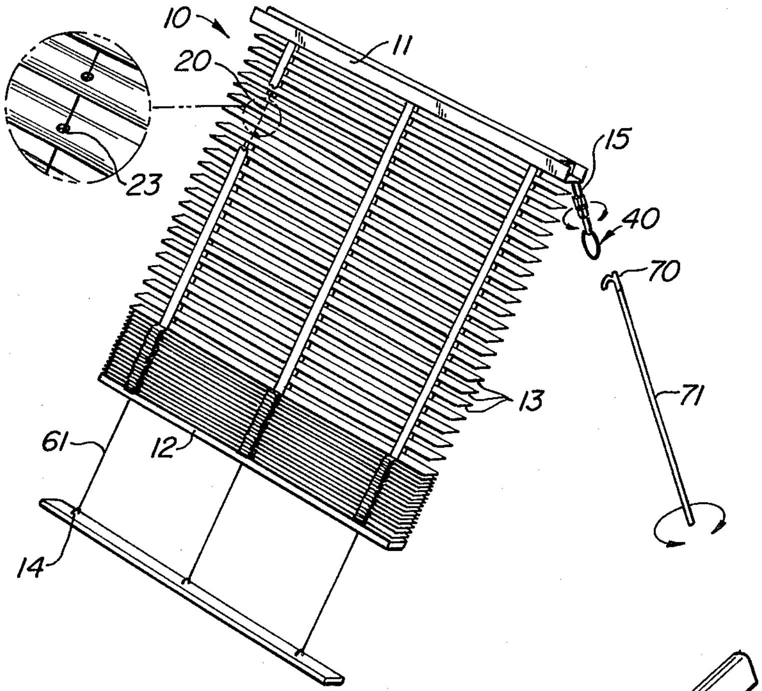
FIG. 1 is a schematic of a typical blind according to the present invention.

The present invention provides a method and an apparatus for mounting a blind, such as a Venetian blind, in any desired orientation without impairing the appearance or utility of the blind and also for adjusting the blind slats without regard to the angle of orientation of the blind. Such a blind 10 (FIG. 1) includes a headrail 11, a baserail 12, and a plurality of parallel spaced slats 13 arranged between the headrail 11 and the baserail 12. The slats 13 may be simultaneously selectively tilted to any desired angle to control the amount of light admitted through the blinds. Additionally, the blind may be raised or lowered as desired (as shown in FIG. 1) for such purposes as window cleaning, ventilation, etc. In the present invention, the blind may be raised or lowered when mounted at an angle up to 45 from vertical.

The blinds according to the present invention operate such that the edges of th slats are maintained in a coplanar orientation regardless of blind orientation. In the present invention, this is accomplished by running guy wires 20 between the headrail and the baserail along the length of the blind perpendicular to the slats to guide the edges of the slats into a coplanar alignment. A guy wire 20 extends through each bracket 22 aperture 24 (FIG. 2) and through an aperture 23, in each slat to either the baserail 12 in the case of a horizontal (ceiling) blind that cannot be raised or lowered or through the baserail 12 and to a frame mount 14 in the case of a blind oriented at up to 45° from vertical. In the latter instance, the force of gravity may pull the baserail 12 downwardly such that the blind may be raised or lowered.

Figure 3:
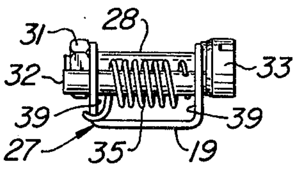
FIG. 3 is an end view of the guy wire tension adjust device.
Figure 4:
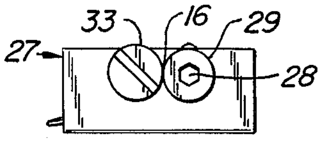
FIG. 4 is a side view of the guy wire tension adjust device.
Figure 5:
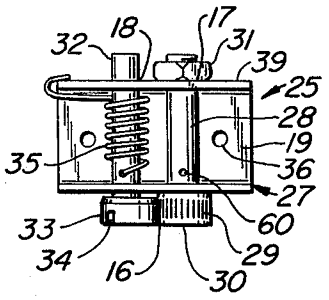
FIG. 5 is a top view of the guy wire tension adjust device.
Figure 6:
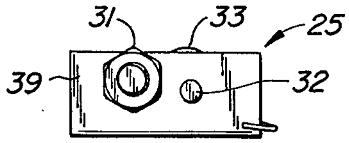
FIG. 6 is a back view of the guy wire tension adjust device.

The guy wire is kept taut by a tensioning or biasing means in the form of a ratchet 25. The ratchet 25 includes a base member 27 (FIGS. 3 and 5) having a bottom portion 19 and a pair of parallel spaced side portions 39. As shown in FIG. *2a*, the base member 27 is secured to the headrail 11 (or baserail 12 in other embodiments, as shown in FIG. *2b*) by fasteners (not shown) inserted through base member apertures 36. The fasteners may be of any type sufficient to secure the base member 27 in place.

The parallel spaced side portions 39 of base member 27 have a first pair of coaxial apertures 18 and a second pair of coaxial apertures 17. The first pair of apertures receives an elongated shaft 32. Shaft 32 (FIG. 5) has an eccentric head portion 33 including a slot 34 and a protuberance 16. The shaft has a rotary bias supplied by a biasing member such as spring 35.

An elongated guy wire spindle 28 is retained to the base member 27 by the second pair of coaxial apertures 17 with a fastener 31. The spindle 28 could be so retained by other such means. Spindle 28 includes an enlarged head portion 29 having a plurality of parallel spaced notches 30 that extend axially along the heads' outer surface. The notches are arranged such that they engage with the shaft protuberance 16 in a ratchet fashion. The spindle is advanced by inserting an allen key 26 into an allen socket 38 within the spindle head 29. Any other such spindle advancing means could be used, such as screwdriver slots, etc.

The guy wire 20 has a first end 61 fastened either to a bottom rail 12 or to a fastener 14. The other guy wire end 62 is brought through aperture 24 and wound about the spindle 28; guy wire end 62 may be inserted through an aperture 60 in the spindle to anchor the guy wire to the spindle.

In operation guy wire 20 is kept taut. To this end, spindle 28 is rotated to wind the guy wire about it. This increases guy wire tautness to a level such that the blind slats are maintained in alignment without regard to blind orientation.

Shaft 32 protuberance 16 is engaged within spindle 28 head 29 notches 30 in a ratchet-like manner. As spindle 28 is rotated to take up guy wire slack, shaft 32 head 33 is lifted past the maximum outward extent of a notch 30, at which point spring 35 forces protuberance 16 into the innermost portion or valley of the next notch and the process repeats. Shaft head 33 is eccentric; the increasing guy wire tension due to winding the guy wire about the spindle tends to jam protuberance 16 into a notch 30 such that spindle 28 is prevented from unwinding. Thus, guy wire tension is maintained.

In some embodiments it may be desirable to loosen the guy wire. For example, when a blind is moved to a different location. To this end, a slot 34 is provided in shaft head 33 such that the protuberance 16, due to the eccentricity of the shaft head 33, may be rotated away from notched spindle head 29. Thus, the spindle may be moved freely in either direction.

Figure 7:
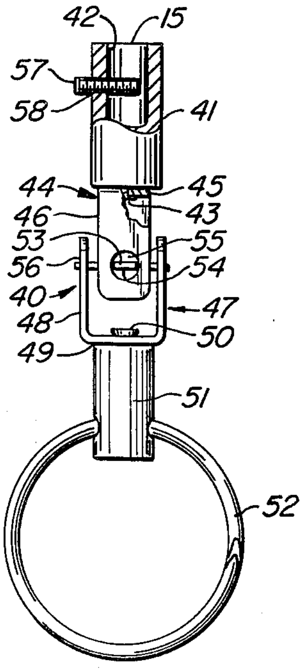
FIG. 7 is a side view of a universal tilt adaptor according to the present invention.
Figure 8:
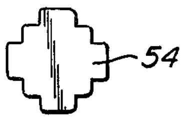
FIG. 8 is a top view of a universal pivot member.

Normally, the blind slats 13 may not be readily tilted when the blind is mounted at an angle other than vertical. That is, the tilt adjust mechanism is usually terminated in an elongated rod (not shown) that is not operable when oriented at angles other than vertical. The present invention includes a universal tilt adapter 40 (FIG. 7) that engages with a tilt adjust stem 15.

Universal tilt adapter 40 includes a bushing member 41 having a bore 42 that receives tilt adjust stem 15. The bushing is retained to tilt adjust stem 15 by any of a number of methods including set screw 57 threaded into bushing aperture 58.

Bushing 41 is fastened to a first yoke 44 at a yoke base portion 45 by fastener 43. The fastener may be a rivet, a bolt, a weld, or the like. Yoke 44 has a pair of spaced parallel side members 46 projecting from yoke base 45 that include a pair of coaxial apertures 55. A universal pivot member 54 includes a pair of projecting pins 53 that engage within the yoke side member apertures 55. Pivot member 54 freely rotates about the axis of the apertures between the two yoke side members 46.

A second yoke member 47 is similarly attached to pivot member 54 at right angles to said first yoke member via coaxial apertures 56 in second yoke member side portions 48. Second yoke member 47 includes a base portion 49 that is fastened to channel member 51 by fastener 50. The fastener may be a rivet, a bolt, a weld, or the like. A ring 52 is freely movable about its axis within channel member 51. In other embodiments of the present invention ring 52 could be engaged within a channel formed by the two side members 48 and the base member 49 of the second yoke member 47.

In operation, a hook 70 on an elongated shaft or rod 71 is engaged within ring 52 and the shaft is then twisted. This twisting motion is translated through the action of the universal joint formed by the yokes 44 and 47 and the pivot member 54, to a rotary motion at tilt adjust stem 15. In this way, the blind slats may be tilted as desired without regard to the orientation of the blind.

The foregoing was given by way of example and illustration. The scope of the invention should be limited only by the following claims.

What is claimed is:

1. In a blind having a plurality of parallel salts, and including a headrail at one end and a baserail at the other end, a device for maintaining said slats in coplanar alignment with regard to blind orientation, comprising:

a guy wire extending along said blind's length and perpendicular to said slats and guiding said slats into coplanar alignment, wherein said guy wire is secured to and extended along said blind's length between said headrail and said baserail; and ratchet means for adjusting said guy wires tautness, including:

(a) an elongated spindle for spooling said guy wire, said spindle having an enlarged cylindrical head portion including a plurality of parallel, spaced notches extending axially along a head outer surface; and (b) an elongated shaft parallel to said spindle and having an enlarged eccentric head portion including an axially extending protuberance for engagement with said spindle's spaced notches, said engagement being unyielding in a guy wire unspooling direction of spindle rotation and said engagement being yielding in a guy wire spooling direction of spindle rotation.

2. The device of claim 1, further comprising:

said ratchet means being secured to said headrail; and said guy wire having a first end secured to said baserail and having a second end spooled onto said spindle.

3. The device of claim 1, further comprising:

said ratchet means being secured to said baserail; and said guy wire having a first end secured to said headrail and having a second end spooled onto said spindle.

4. In a blind having a plurality of parallel slats including means for simultaneously tilting said slats to a desired angle, said blind further including a headrail at one end and a baserail at another end, a device for maintaining said slats in coplanar alignment without regard to blind orientation and for allowing tilting of said slats, comprising:

flexible tension means in the form of a guy wire extending along said blind's length between said headrail and said baserail perpendicular to said slats, for guiding said slats into coplanar alignment;

bias means in the form of a ratchet for adjusting said guy wire's tautness, said ratchet including an elongated spindle for spooling said guy wire and having an enlarged cylindrical head portion including a plurality of parallel, spaced notches extending axially along an outer surface of said head portion, and including a biased, elongated shaft parallel to said spindle and having an enlarged eccentric head portion including an axially extending protuberance for engagement with said spindle's spaced notches, said engagement being unyielding in a guy wire unspooling direction of spindle rotation and said engagement being yielding in a guy wire spooling direction of spindle rotation; and universal means secured to said tilting means for adjusting the tilt of said slats without regard to blind orientation.

5. In a blind having a plurality of parallel slats and including a device in the form of a guy wire for maintaining said slats in coplanar alignment without regard to blind orientation, means for biasing said guy wire comprising:

a ratchet mounted at one end of said blind and including:

(a) an elongated spindle for spooling said guy wire and having an enlarged cylindrical head portion including a plurality of parallel, spaced notches extending axially along a head outer surface;

(b) a biased, elongated shaft parallel to said spindle and having an enlarged eccentric head portion including an axially extending protuberance for engagement with said spindle spaced notches, said engagement being unyielding in a guy wire unspooling direction of spindle rotation and said engagement being yielding in a guy wire spooling direction of spindle rotation; and (c) a ratchet base member having a bottom portion adapted to be secured to said blind and having parallel spaced side portions, said side portions having a first pair of coaxial apertures for retaining said spindle therein between said side portions and having a second pair of coaxial apertures for retaining said shaft therein between said side portions.

* * * * *

UNITED STATES PATENT AND TRADEMARK OFFICE
CERTIFICATE OF CORRECTION

PATENT NO. : 4,433,713

DATED : February 28, 1984

INVENTOR(S) : Larry L. Kelly

Figure 2:
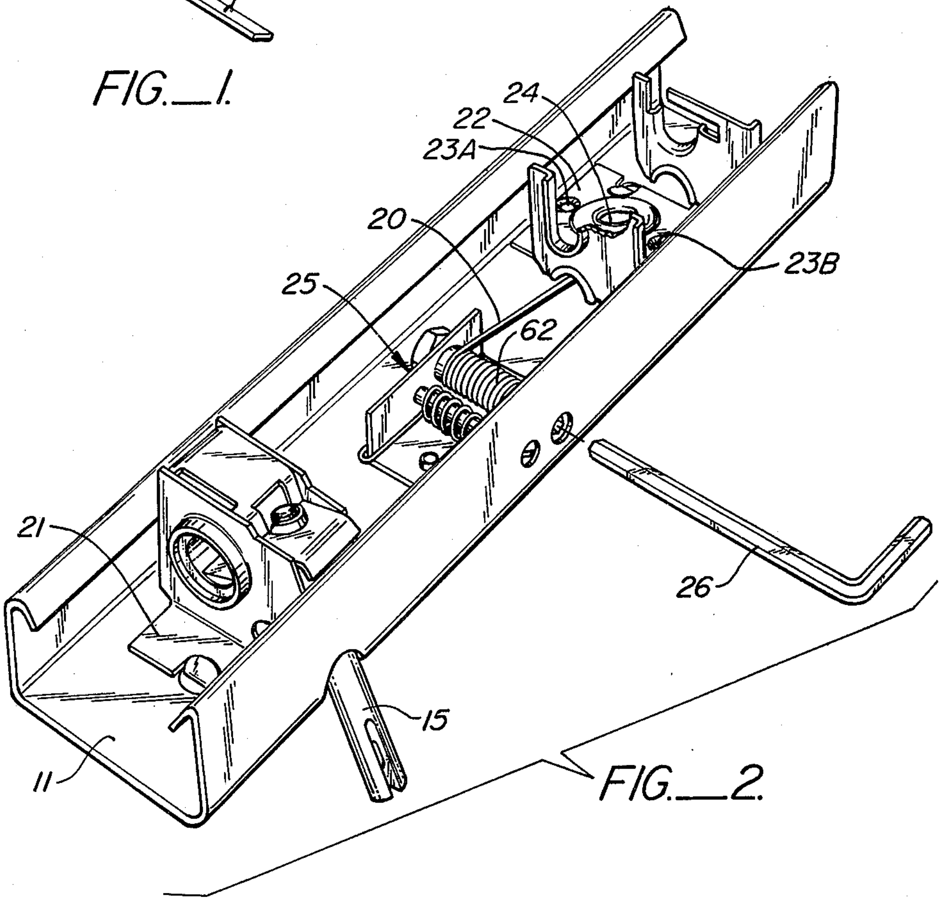
FIG. 2*a* is an overhead perspective view of a blind headrail including a guy wire tension adjust device according to the present invention.
FIG. 2*b* is a bottom perspective view of a blind base rail including a guy wire tension adjust device according to the present invention.
Figure 2A:
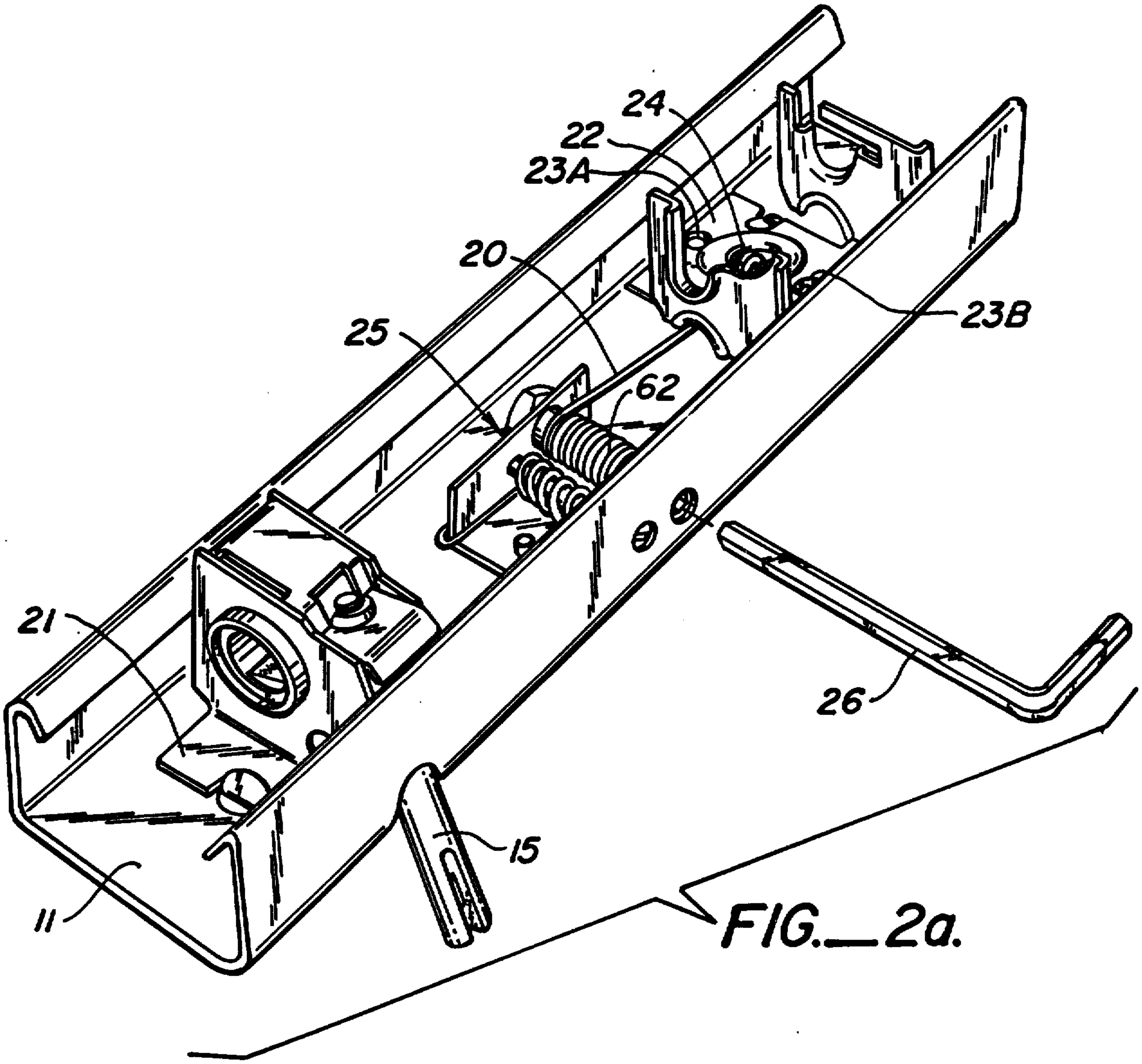
Figure 2B:
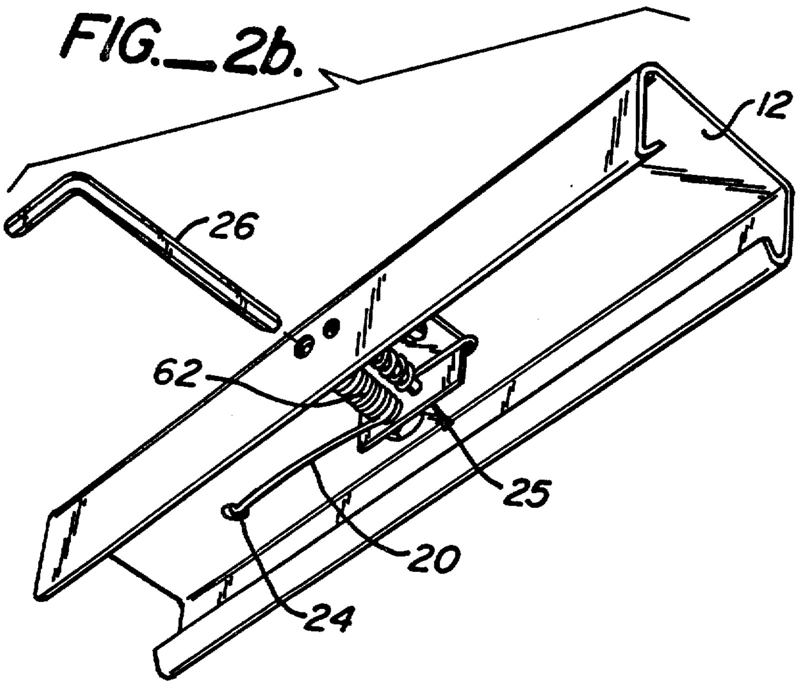

It is certified that error appears in the above-identified patent and that said Letters Patent is hereby corrected as shown below:

Fig. 2 is replaced by Figs. 2A and 2B attached herewith.

Signed and Sealed this

*Sixteenth* Day of *October 1984*

[SEAL]

*Attest:*

GERALD J. MOSSINGHOFF

*Attesting Officer* *Commissioner of Patents and Trademarks*